(12) United States Patent
Moser et al.

(10) Patent No.: US 11,150,115 B2
(45) Date of Patent: Oct. 19, 2021

(54) HOUSING FOR A FIELD DEVICE IN MEASURING AND AUTOMATION TECHNOLOGY FOR MONITORING AND/OR DETERMINING AT LEAST ONE PROCESS VARIABLE OF A MEDIUM

(71) Applicant: Endress+Hauser Flowtec AG, Reinach (CH)

(72) Inventors: Thiérry Moser, Sierentz (FR); Niklaus Hänggi, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 321 days.

(21) Appl. No.: 16/340,759

(22) PCT Filed: Oct. 9, 2017

(86) PCT No.: PCT/EP2017/075639
§ 371 (c)(1),
(2) Date: Apr. 10, 2019

(87) PCT Pub. No.: WO2018/069226
PCT Pub. Date: Apr. 19, 2018

(65) Prior Publication Data
US 2020/0049537 A1 Feb. 13, 2020

(30) Foreign Application Priority Data
Oct. 10, 2016 (DE) .................. 10 2016 119 180.9

(51) Int. Cl.
*G01D 11/24* (2006.01)
(52) U.S. Cl.
CPC ............................. *G01D 11/245* (2013.01)

(58) Field of Classification Search
CPC ....... G01D 11/45; G01D 11/24; G01D 11/245
(Continued)

(56) References Cited

U.S. PATENT DOCUMENTS 3,869,915 A  3/1975 Baumoel
4,823,411 A * 4/1989 Nettel ....................... E03C 1/30
                                                            138/89
(Continued)

FOREIGN PATENT DOCUMENTS

DE    945042 B1   6/1956
DE    1081100 A1  5/1960
(Continued)

OTHER PUBLICATIONS

Search Report for German Patent Application No. 10 2016 119 180.9, German Patent Office, dated Sep. 12, 2017, 6 pp.
(Continued)

*Primary Examiner* — John Fitzgerald
*Assistant Examiner* — Jean F Morello
(74) *Attorney, Agent, or Firm* — Christopher R. Powers; Endress+Hauser (USA) Holding Inc.

(57) ABSTRACT

The present disclosure relates to a housing for a field device in measuring and automation technology for monitoring and/or determining at least one process variable of a medium, wherein the housing includes at least one housing body which has, in the interior thereof, a housing chamber which is defined by a housing wall, wherein the housing wall has at least one opening, into which opening a threaded element is inserted in a releasably fastened manner, which threaded element is set up to receive a cover, wherein the opening can be tightly closed by means of the cover.

18 Claims, 5 Drawing Sheets

(58) Field of Classification Search
USPC .......................................................... 73/431
See application file for complete search history.

(56) References Cited

U.S. PATENT DOCUMENTS

| | | |
|---|---|---|
| 2007/0151362 A1 | 7/2007 | Mori et al. |
| 2010/0257930 A1 | 10/2010 | Isenmann et al. |
| 2011/0058313 A1 | 3/2011 | Hausler et al. |
| 2011/0147384 A1 | 6/2011 | Baughman |

FOREIGN PATENT DOCUMENTS

| | | |
|---|---|---|
| DE | 1525769 A1 | 12/1969 |
| DE | 3215632 A1 | 11/1983 |
| DE | 19724652 A1 | 12/1997 |
| DE | 19625667 A1 | 1/1998 |
| DE | 10124933 A1 | 11/2002 |
| DE | 69625402 T2 | 5/2005 |
| DE | 102005059662 A1 | 6/2007 |
| DE | 102009046871 A1 | 6/2010 |
| DE | 102010022530 A1 | 12/2011 |
| DE | 102011005170 A1 | 9/2012 |
| DE | 102015107753 A1 | 11/2016 |
| EP | 0945714 A1 | 9/1999 |
| KR | 100921791 B1 | 10/2009 |
| WO | 8808516 A1 | 11/1988 |

OTHER PUBLICATIONS

International Search Report for Patent Application No. PCT/EP2017/075639,WIPO, dated Jan. 11, 2018, 12 pp.

\* cited by examiner

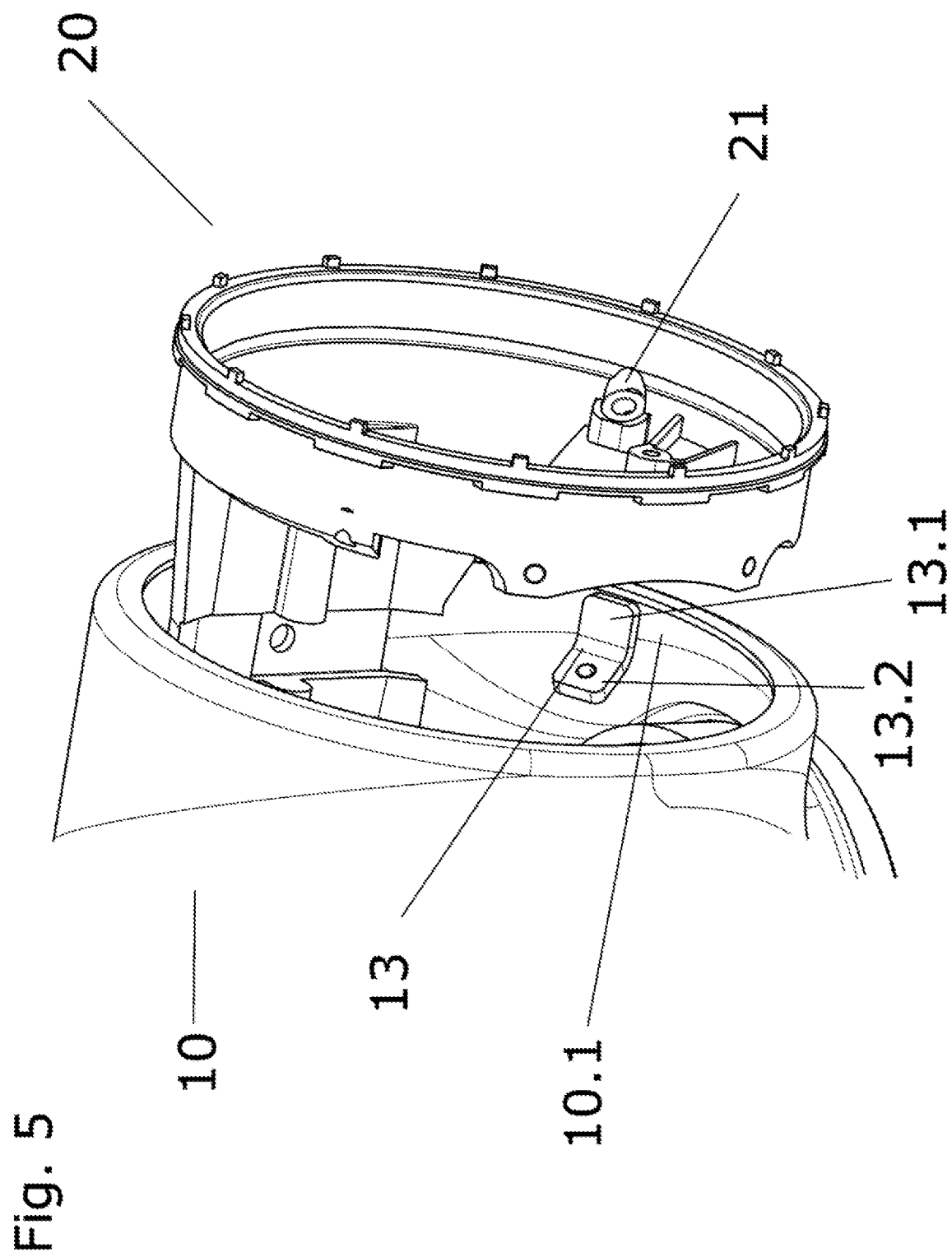

HOUSING FOR A FIELD DEVICE IN MEASURING AND AUTOMATION TECHNOLOGY FOR MONITORING AND/OR DETERMINING AT LEAST ONE PROCESS VARIABLE OF A MEDIUM

CROSS-REFERENCE TO RELATED APPLICATIONS

The present application is related to and claims the priority benefit of German Patent Application No. 10 2016 119 180.9, filed on Oct. 10, 2016, and International Patent Application No. PCT/EP2017/075639 filed on Oct. 9, 2017, the entire contents of which are incorporated herein by reference.

TECHNICAL FIELD

The invention relates to a housing for a field device in measuring and automation technology for monitoring and/or determining at least one process variable of a medium.

BACKGROUND

Housings of field devices have one or more housing chambers in their interior, in which housing chamber an electronic measuring and/or operating circuit is accommodated. In addition, field devices have at least one opening that can be closed by a cover, for example in order to have access to the electronic measuring and/or operating circuit or to provide a window to a display unit.

The prior art in the form of the patent application DE 102005059662 A1 shows cover closures with which the cover is either pressed against the housing with at least one screw or the cover has a thread with which it is screwed to a thread of the housing.

In the food and pharmaceutical industry, the known cover closures are disadvantageous because, on the one hand, pressing the cover against the housing by means of a screw provides access to the inside of the housing and, on the other hand, a thread can be introduced on or into a housing only poorly so that small tolerances or gap dimensions can only be achieved with great effort, if at all.

Therefore, the object is to propose a housing that avoids the disadvantages mentioned above from the perspective of hygiene.

SUMMARY

The object is solved by a housing according to the present disclosure, by a transducer module according to the present disclosure and by a measuring instrument according to the present disclosure.

The housing according to the invention for a field device in measuring and automation technology for monitoring and/or determining at least one process variable of a medium comprises at least one housing body which has, in the interior thereof, a housing chamber which is defined by a housing wall; and at least one cover, wherein the housing wall has at least one opening, which can be closed by the cover, characterized in that the housing has at least one threaded element, which is inserted into the opening, especially, inserted in a releasably fastened manner, wherein the threaded element is configured to receive the cover, wherein the opening can be tightly closed by means of the cover, and wherein the threaded element has a first thread, and wherein the cover has a second thread complementary to the first thread.

In one embodiment, the housing wall in the interior of the housing chamber has at least one retaining element for retaining the threaded element.

In one embodiment, the housing has a sealing element, which is arranged between the housing body and the cover and is configured to close a gap between the housing body and the cover.

In one embodiment, the threaded element has at least one stop on a front side facing the cover, wherein the stop projects from the front side, and wherein the sealing element has a third opening that is complementary to the stop, and wherein the sealing element can be fastened to the threaded element by inserting the stop into the third opening.

In one embodiment, the retaining element is fastened to the housing wall by gluing, welding or soldering.

In one embodiment, the threaded element is connected to the retaining element in a positively locking or firmly bonded manner, wherein the joining is accomplished especially by soldering, welding, gluing, riveting, screwing together by means of a screw with a nut, or latching by means of a latching mechanism.

In one embodiment, the retaining element has a first segment and a second segment, wherein the second segment adjoins the first segment, and wherein the first segment is configured to be fastened to the housing wall and wherein the second segment is configured to be connected to the threaded element.

In one embodiment, the first segment and the second segment enclose an angle of at least 45 degrees and especially at least 65 degrees and preferably at least 85 degrees and at most 135 degrees and especially at most 115 degrees and preferably at most 95 degrees.

In one embodiment, the housing is fabricated from two half-shells, which half-shells are joined by welding, soldering or gluing.

In one embodiment, the half-shells are fabricated by means of deep drawing.

In one embodiment, the housing has a first opening and a second opening, wherein a first threaded axis of the first opening and a second threaded axis of the second opening have an intersecting angle of at least 45 degrees and especially at least 65 degrees and preferably at least 85 degrees and at most 135 degrees and especially at most 115 degrees and preferably at most 95 degrees.

In one embodiment, the housing body has a first material and the threaded element has a second material that is different from the first material.

In one embodiment, the second material comprises plastic, cast steel or aluminum, and wherein the first material comprises a steel sheet, especially made of stainless steel.

The transducer module according to the invention comprises a housing according to the invention and an electronics unit for processing a measurement signal representing the process variable, wherein the electronics unit is arranged in the housing chamber.

The measuring instrument according to the invention comprises a transducer module according to the invention and a sensor module for recording a measured value and for providing signals depending on the measured value, wherein the sensor module is electrically and mechanically connected to the transducer module, wherein the electronics unit is configured to process the signals provided by the sensor module.

The present invention thus proposes a housing with a releasably fastenable threaded element, which is inserted into the opening, especially, inserted in a releasably fastened manner, as well as a transducer module and a measuring instrument.

BRIEF DESCRIPTION OF THE DRAWING

In the following, the invention is described on the basis of exemplary embodiments.

FIG. 5 shows a retaining element of an exemplary embodiment of a housing according to the invention with the corresponding connecting element of a threaded element.

DETAILED DESCRIPTION

Figure 1:
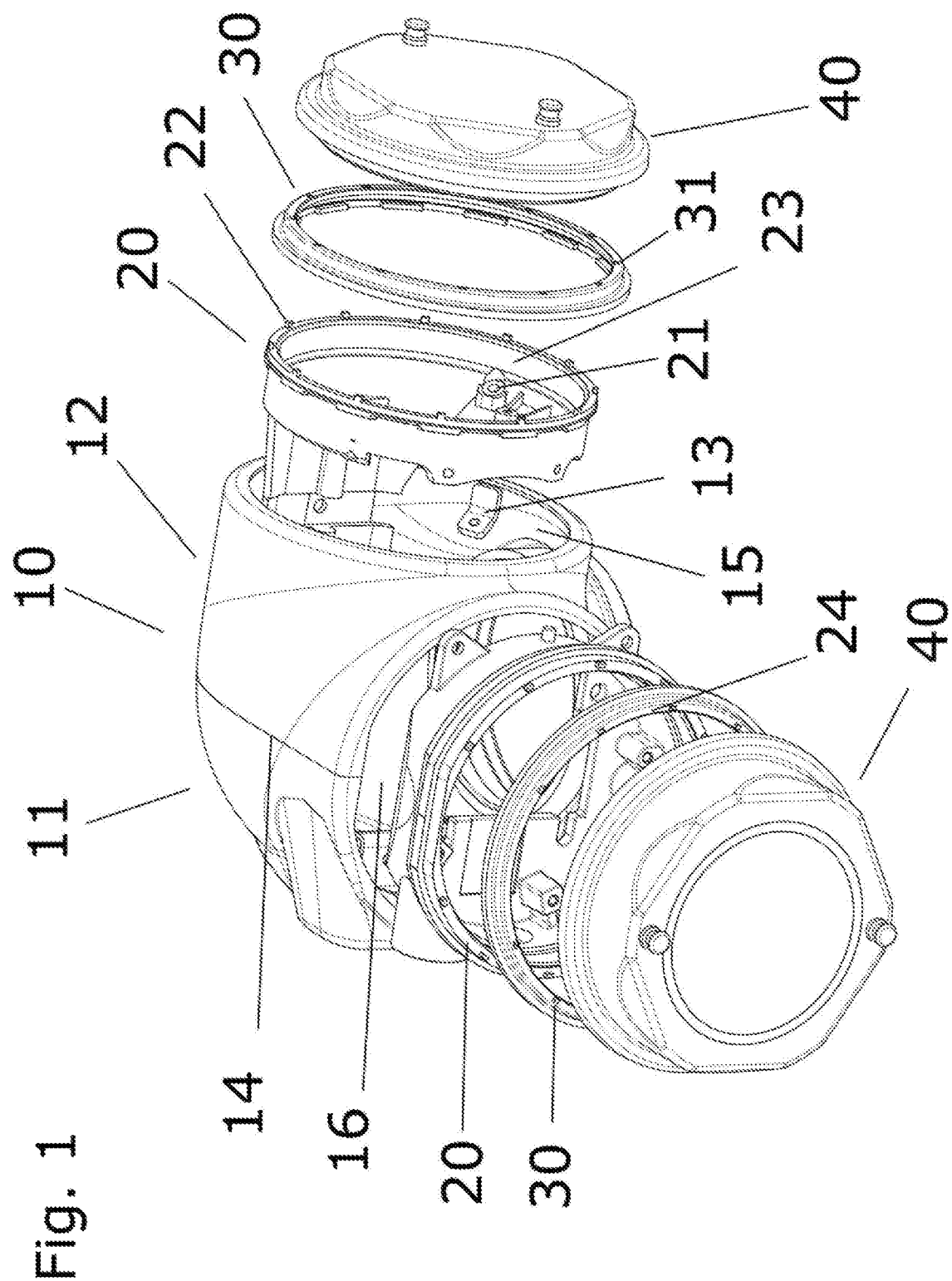
FIG. 1 shows an exemplary embodiment of a housing according to the invention with insertable threaded elements, sealing elements and covers.

FIG. 1 shows an exemplary embodiment of a housing 10 according to the invention comprising two housing half-shells 11, 12 which are joined together along two contact surfaces 14 and define a first opening 15 and a second opening 16. In the first opening 15 and in the second opening 16, a threaded element 20 according to the invention can respectively be inserted, which threaded elements 20 are respectively releasably fastened to the housing by means of at least one connecting element 21 via at least one corresponding retaining element 13 of the housing 10. In this case, the threaded element 20 can be fastened to the retaining element 13 of the housing by screwing together by means of a screw with a nut. Alternatively, fastening can also be achieved by soldering, welding, gluing, riveting, or latching using a latching mechanism. The retaining element 13 and connecting element 21 shown as examples in FIG. 1 and FIG. 5, respectively, have an opening for receiving a screw. Each of the threaded elements 20 has a first thread 23, which is an internal thread as shown in FIG. 1 but which can also be an external thread. Via the first thread 23, the cover 40 can be connected with a second thread 41 complementary to the first thread 23 and shown in FIG. 4 by means of screwing on the cover 40 with the threaded element 20. The threaded element 20 has stops 22, which are configured to stop the unscrewing of the cover when a target position is reached. A sealing element 30, which is arranged between the threaded element 20 and the cover 40, seals a gap between the cover 40 and the housing 10. The stops 22 project from a first side 24 allocated to the corresponding cover 40 and engage in complementary third openings 31 of the sealing element in order to hold the sealing element 20. In this case, the threaded element 20 preferably comprises plastic, cast steel or aluminum. The first opening 15 and the second opening 16 have an angle of 90 degrees relative to each other.

Figure 2:
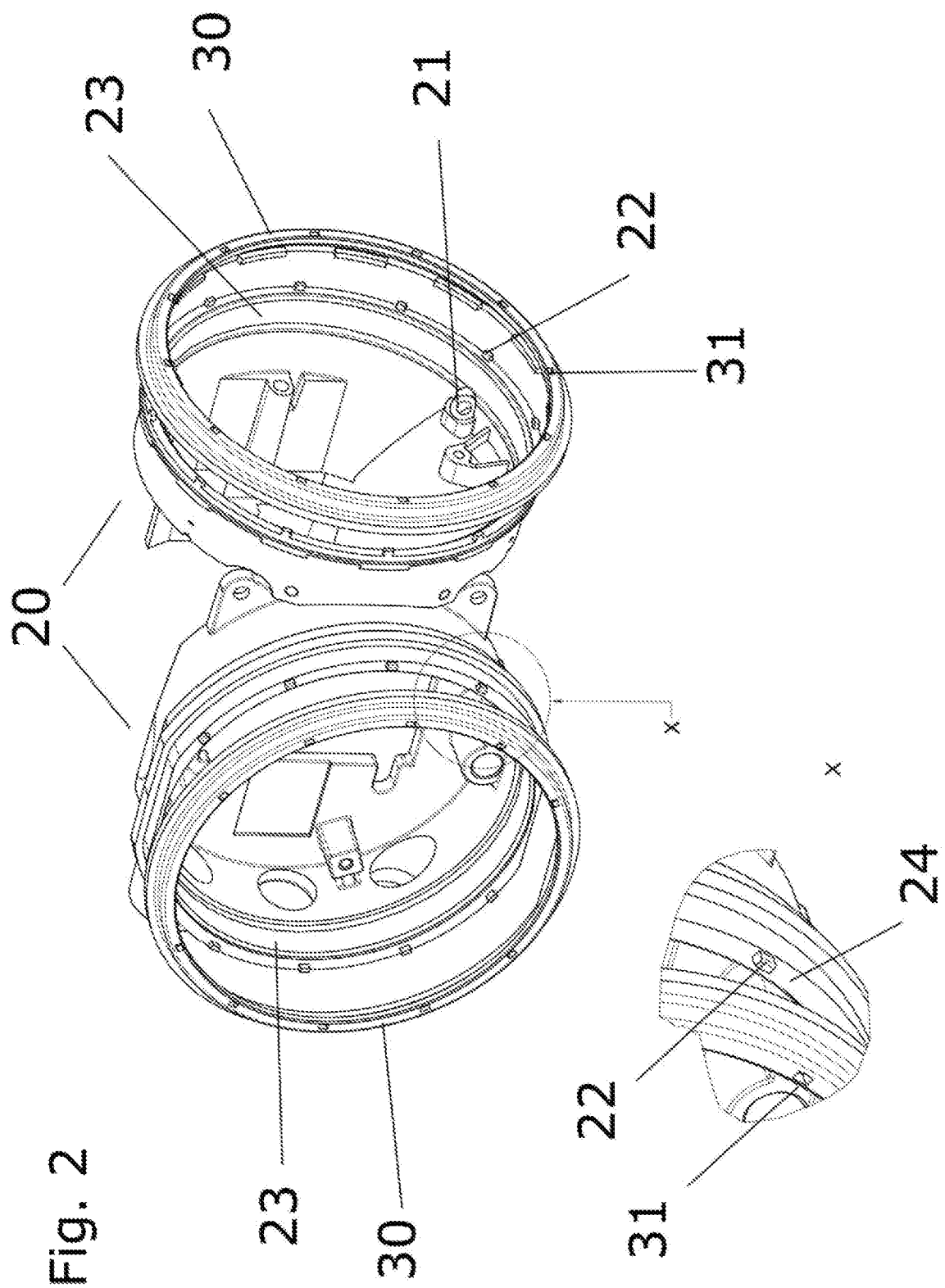
FIG. 2 shows threaded elements with sealing elements with a detailed view of a connection mechanism between a threaded element and a sealing element of an exemplary embodiment of a housing according to the invention.

FIG. 2 shows a detailed view of two threaded elements 20 according to the invention with corresponding sealing elements 30 according to the invention. The enlarged cut-out X shows a stop 22 projecting from a first side 24 and a corresponding third opening 31 of the sealing element 30.

Figure 3:
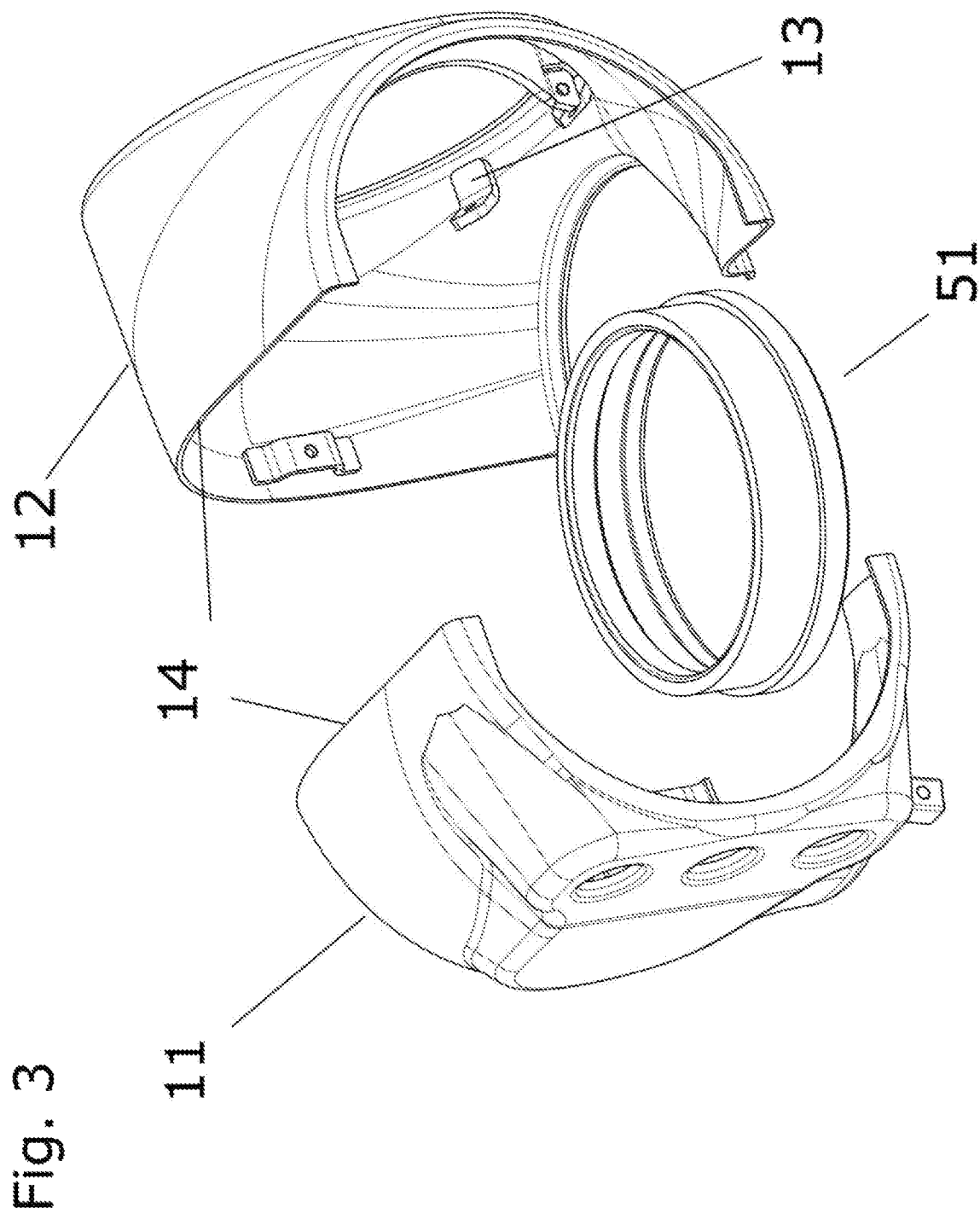
FIG. 3 shows two housing half-shells of an exemplary embodiment of a housing according to the invention with a connecting ring, which half-shells can be assembled to form a housing.

FIG. 3 shows two housing half-shells 11, 12, which can be joined together along the contact surfaces 14 to form a housing 10. Depending on the material properties of the housing half-shells 11, 12, the joining process may comprise welding, soldering or gluing. In this case, the housing half-shells are preferably fabricated from a steel sheet by drawing, especially, deep drawing. The joining of the housing half-shells defines an opening of the housing in which a connecting ring 51 of a sensor module 50 shown in FIG. 4 can be inserted.

Figure 4:
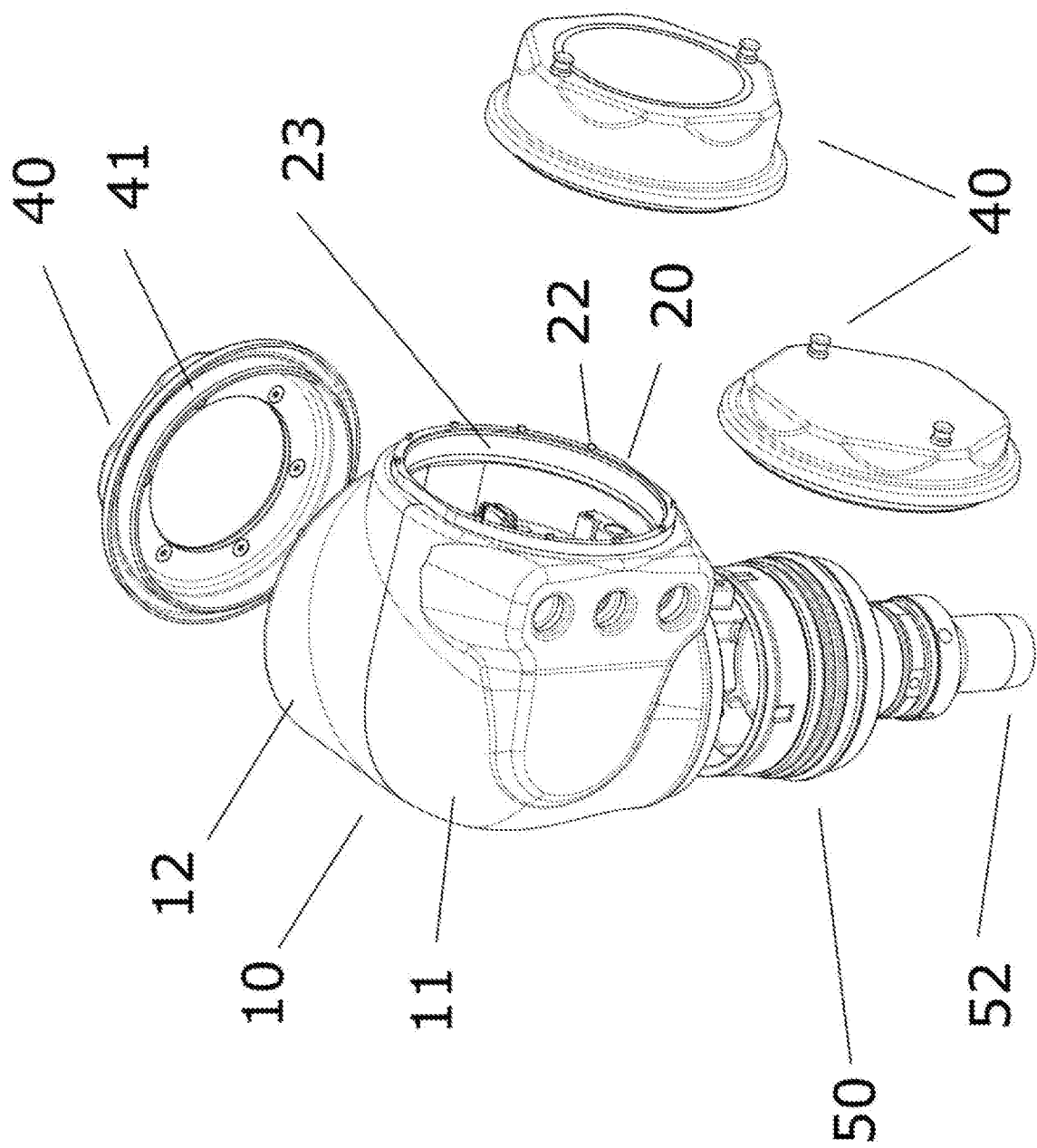
FIG. 4 shows a housing according to the invention with inserted threaded elements according to the invention and measuring sensor connection.

FIG. 4 shows a measuring instrument with a transducer module with a housing 10 with housing half-shells 11, 12 and a sensor module 50, wherein the sensor module is connected to the transducer module 52 via a sensor module connection therebetween. An electronics unit, belonging to the transducer module, for processing a measurement signal representing the process variable is not shown. In this case, the sensor module connection 50 is joined, especially, welded, to the housing 10 by means of the connecting ring 51 shown in FIG. 3. The cover 40 has a second thread 41 complementary to the first thread 23 of the threaded element 20 so that the cover 40 can be connected to the threaded element by means of screws.

FIG. 5 shows an enlarged view of a retaining element 13 fastened to a housing wall 10.1 of the housing 10. The retaining element has a first segment 13.1 and a second segment 13.2 adjoining the first segment, wherein the retaining element 13 is fastened to the housing wall 10.1 via the first segment 13.1, for example by welding, gluing or soldering. The second segment has, for example, an opening for receiving a rivet or a screw. The connecting element 21 of the threaded element 20 that belongs to the retaining element also has, for example, an opening for receiving a rivet or screw so that the threaded element can be fastened to the housing by means of a screw or a rivet via the retaining element. However, in the case of a retaining element or a connecting element according to the invention, an opening can also be dispensed with if the connection is achieved, for example, by soldering, welding or gluing.

Thus, a threaded element 20 can be inserted into the housing 10 according to the invention in a releasably fastened manner, wherein the housing can be assembled from two housing half-shells.

The invention claimed is:
1. A housing for a field device of measuring and automation technology for monitoring and/or determining at least one process variable of a medium, the housing comprising:
at least one threadless housing body including a housing wall that at least partially defines a housing chamber within an interior of the housing body, wherein the housing wall has at least one opening;
at least one cover configured to enable the cover to close the at least one opening in the housing wall;
at least one threaded element disposed and releasably fastened within the opening, wherein the at least one threaded element is configured to receive the cover such that the opening can be closed by the cover; and
at least one retaining element attached to the housing wall within the housing chamber, the at least one retaining element configured to retain the threaded element,
wherein the at least one threaded element has a first thread, and the cover has a second thread complementary to the first thread.

2. The housing of claim 1, wherein the at least one retaining element is attached to the housing wall by gluing, welding or soldering.

3. The housing of claim 1, wherein the threaded element is connected to the retaining element in a positively locking or firmly bonded manner, wherein the connecting is by soldering, welding, gluing, riveting, fastening using a screw with a nut, or latching using a latching mechanism.

4. The housing of claimer 1, wherein the retaining element has a first segment and a second segment, wherein the second segment adjoins the first segment, wherein the first segment is configured to be fastened to the housing wall, and wherein the second segment is connected to the threaded element.

5. The housing of claim 4, wherein the first segment and the second segment define an angle of at least 45 degrees and at most 135 degrees.

6. The housing of claim 4, wherein the first segment and the second segment define an angle of at least 65 degrees and at most 115 degrees.

7. The housing of claim 4, wherein the first segment and the second segment define an angle of at least 85 degrees and at most 95 degrees.

8. The housing of claim 1, further comprising a sealing element disposed between the housing body and the cover and configured to close a gap between the housing body and the cover.

9. The housing of claim 8, wherein the threaded element has at least one stop on a front side facing the cover, wherein the stop projects from the front side, wherein the sealing element has a stop opening that is complementary to the stop, and wherein the stop extends into the stop opening when the sealing element is assembled to the threaded element.

10. The housing of claim 1, wherein the housing body includes two half-shells, which half-shells are joined along corresponding contact surfaces by welding, soldering or gluing.

11. The housing of claim 10, wherein the half-shells are fabricated by deep drawing.

12. The housing of claim 1, wherein the housing body includes a first opening and a second opening, wherein a first threaded axis of the first opening and a second threaded axis of the second opening have an intersecting angle of at least 45 degrees and at most 135 degrees.

13. The housing of claim 12, wherein the first threaded axis of the first opening and the second threaded axis of the second opening have an intersecting angle of at least 65 degrees and at most 115 degrees.

14. The housing of claim 12, wherein the first threaded axis of the first opening and the second threaded axis of the second opening have an intersecting angle of at least 85 degrees and at most 95 degrees.

15. The housing of claim 1, wherein the housing body is of a first material and the threaded element is of a second material that is different from the first material.

16. Housing according to claim 15, wherein the second material is a plastic, cast steel or aluminum, and wherein the first material is a steel sheet.

17. A transducer module, comprising:
   a housing according to claim 1; and
   an electronics unit configured to process a measurement signal representing the process variable from a transducer, wherein the electronics unit is disposed in the housing chamber.

18. A measuring instrument, comprising:
   a transducer module according to claim 17; and
   a sensor module configured for recording a measured value and for generating signals depending on the measured value,
   wherein the sensor module is electrically and mechanically connected to the transducer module, and wherein the electronics unit is configured to process the signals generated by the sensor module.

* * * * *